No. 841,679. PATENTED JAN. 22, 1907.
W. FEHR.
MACHINE FOR THE MANUFACTURE OF HEDDLES.
APPLICATION FILED JAN. 20, 1906.
11 SHEETS—SHEET 1.
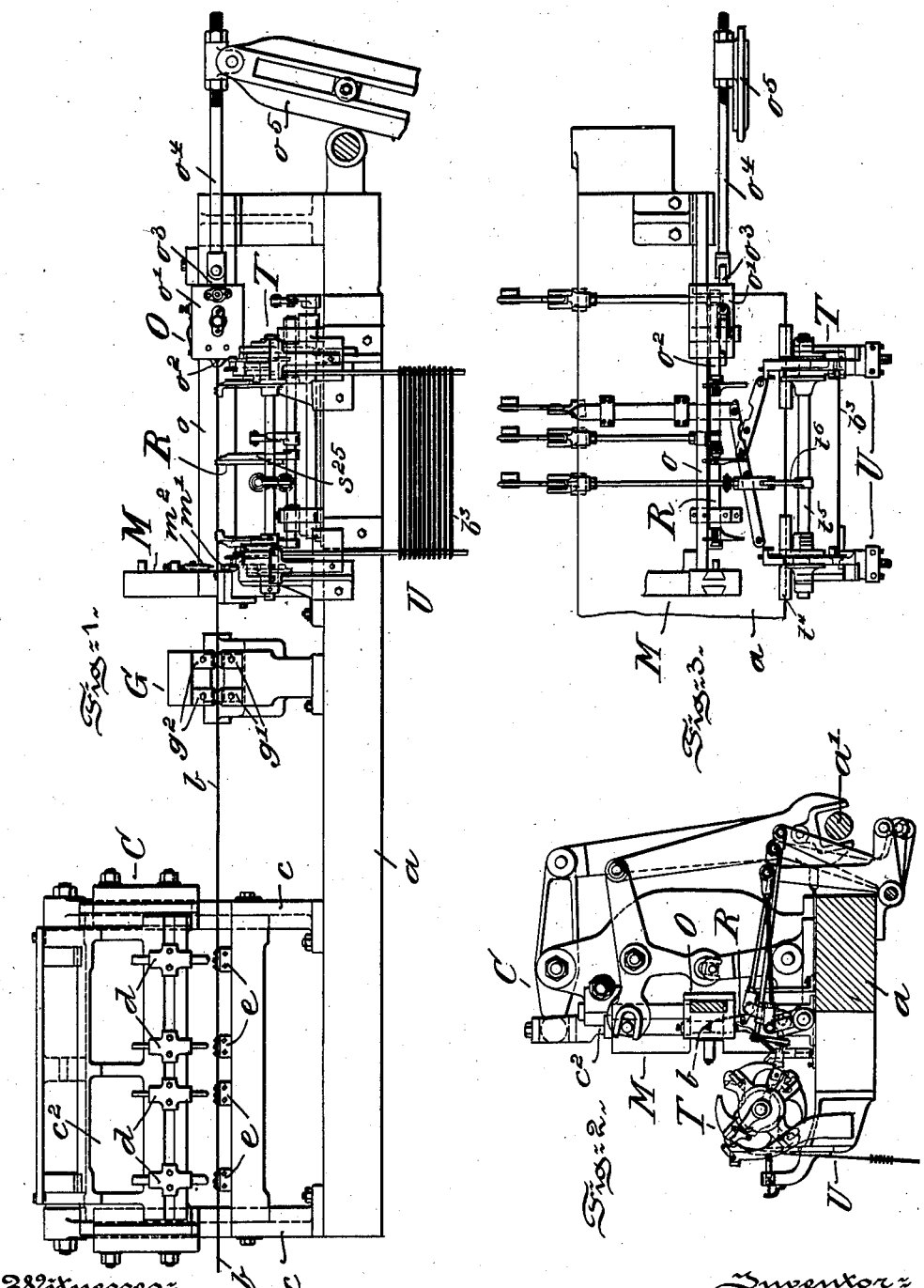

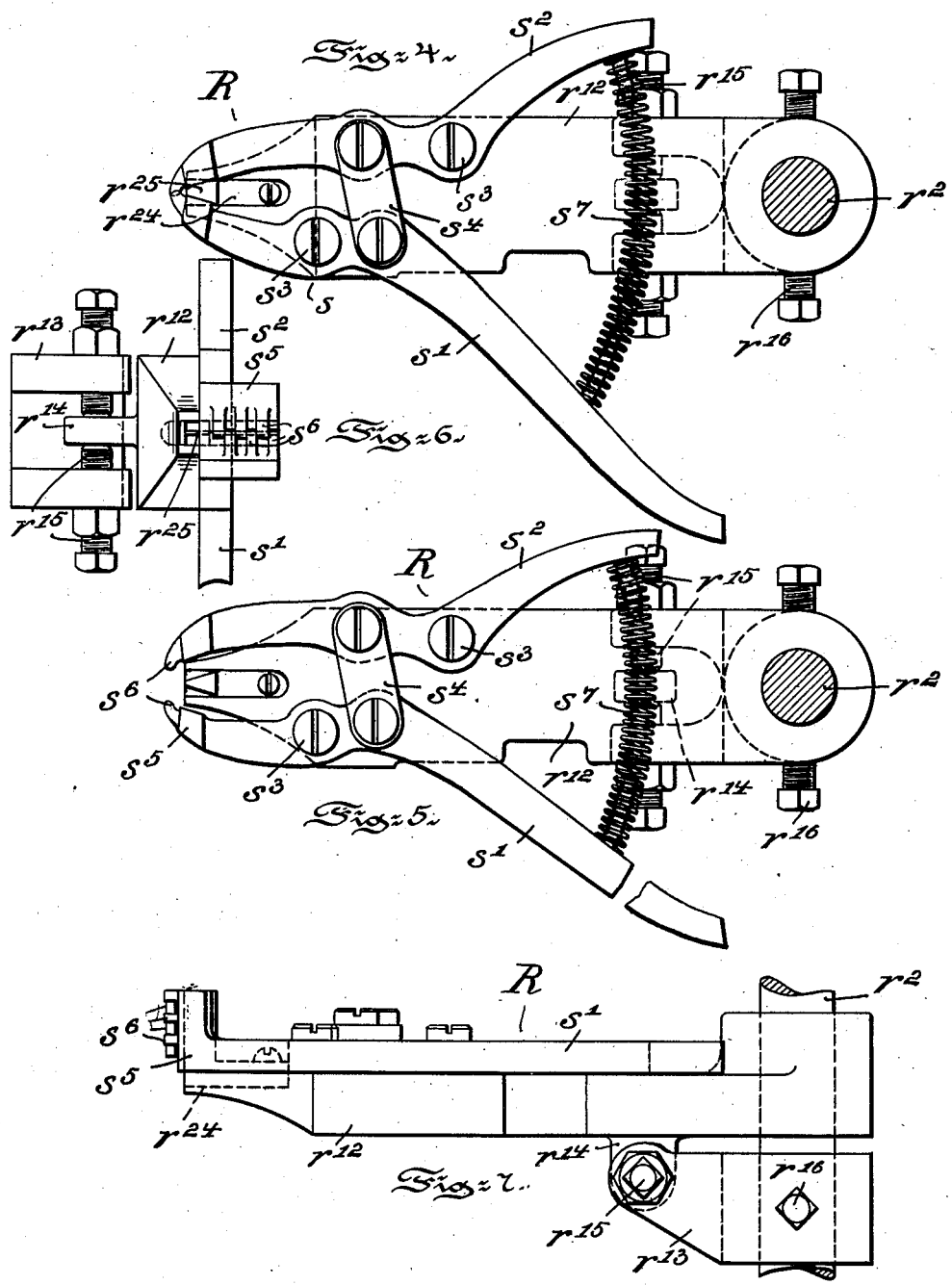

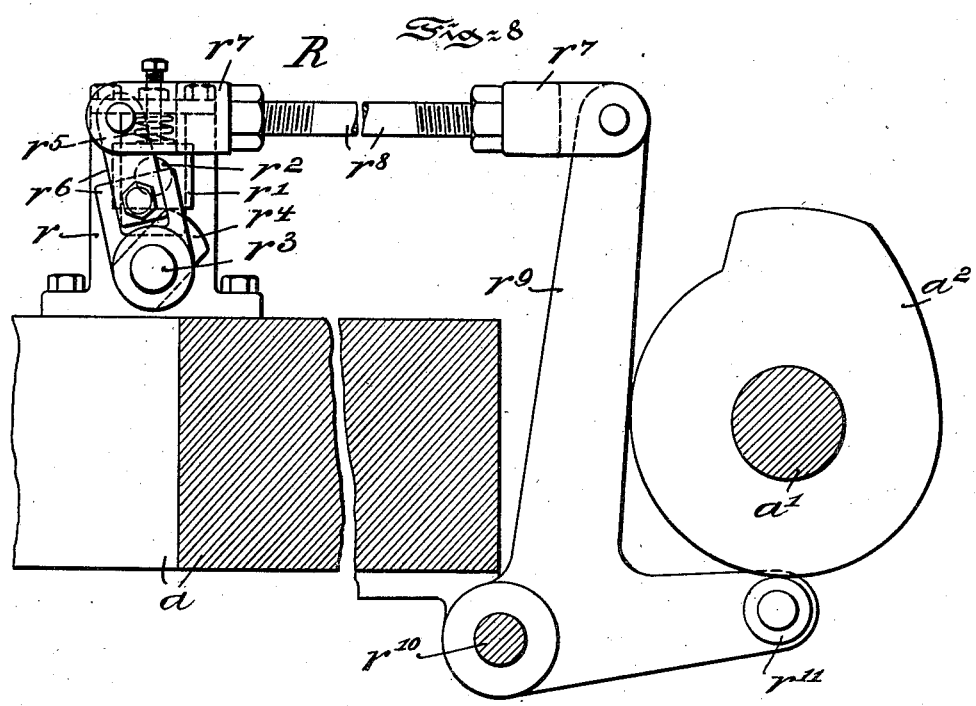
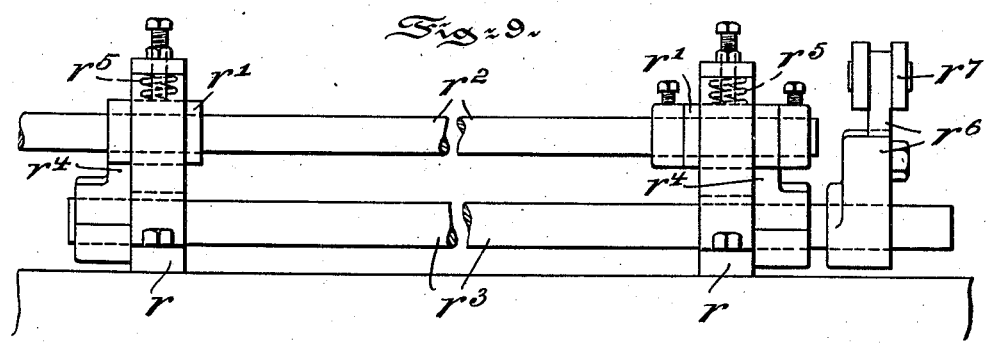

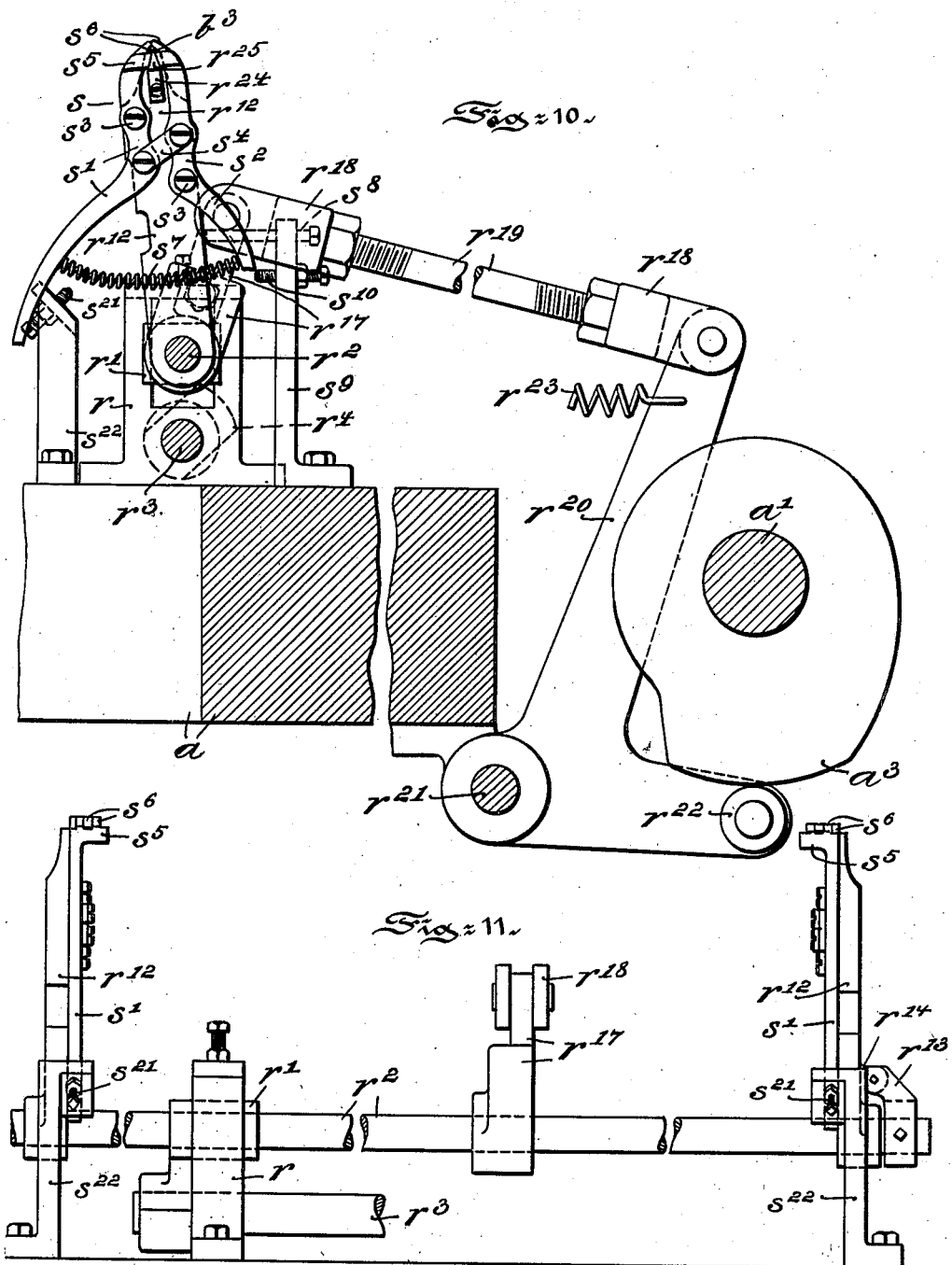

No. 841,679. PATENTED JAN. 22, 1907.
W. FEHR.
MACHINE FOR THE MANUFACTURE OF HEDDLES.
APPLICATION FILED JAN. 20, 1906.
11 SHEETS—SHEET 5.
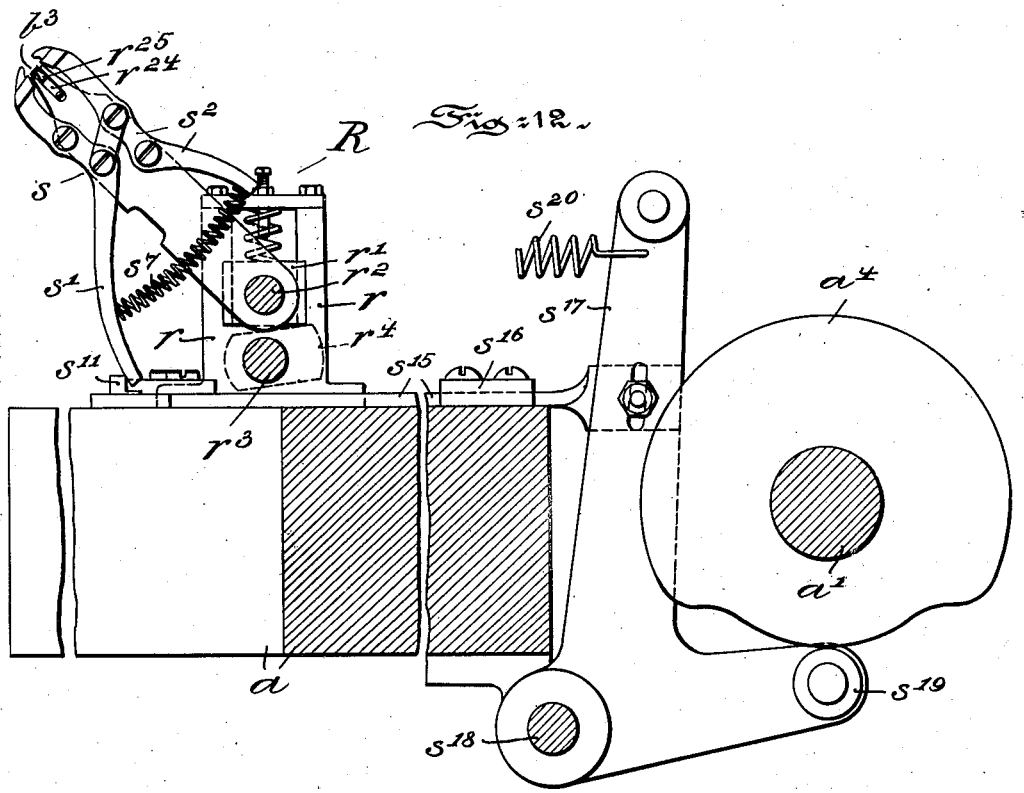
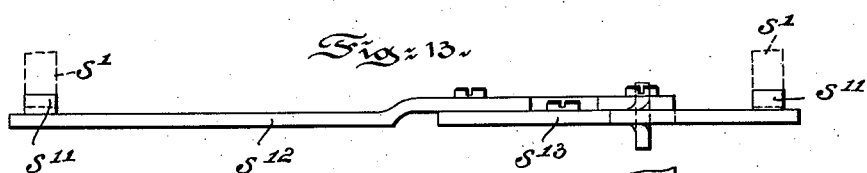
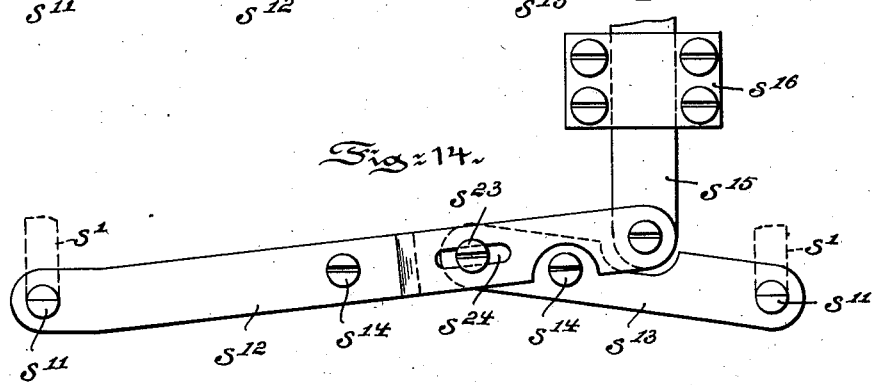

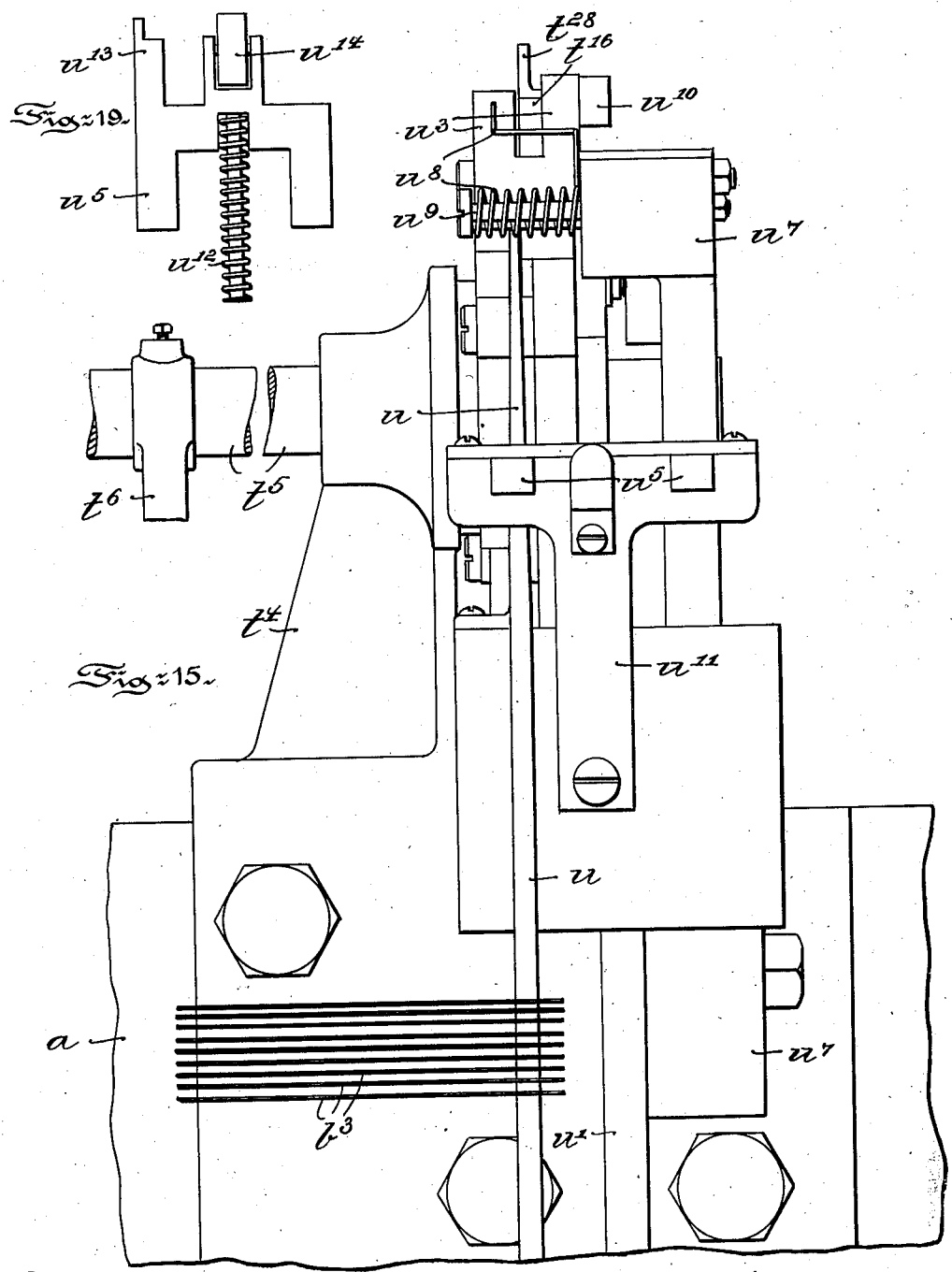

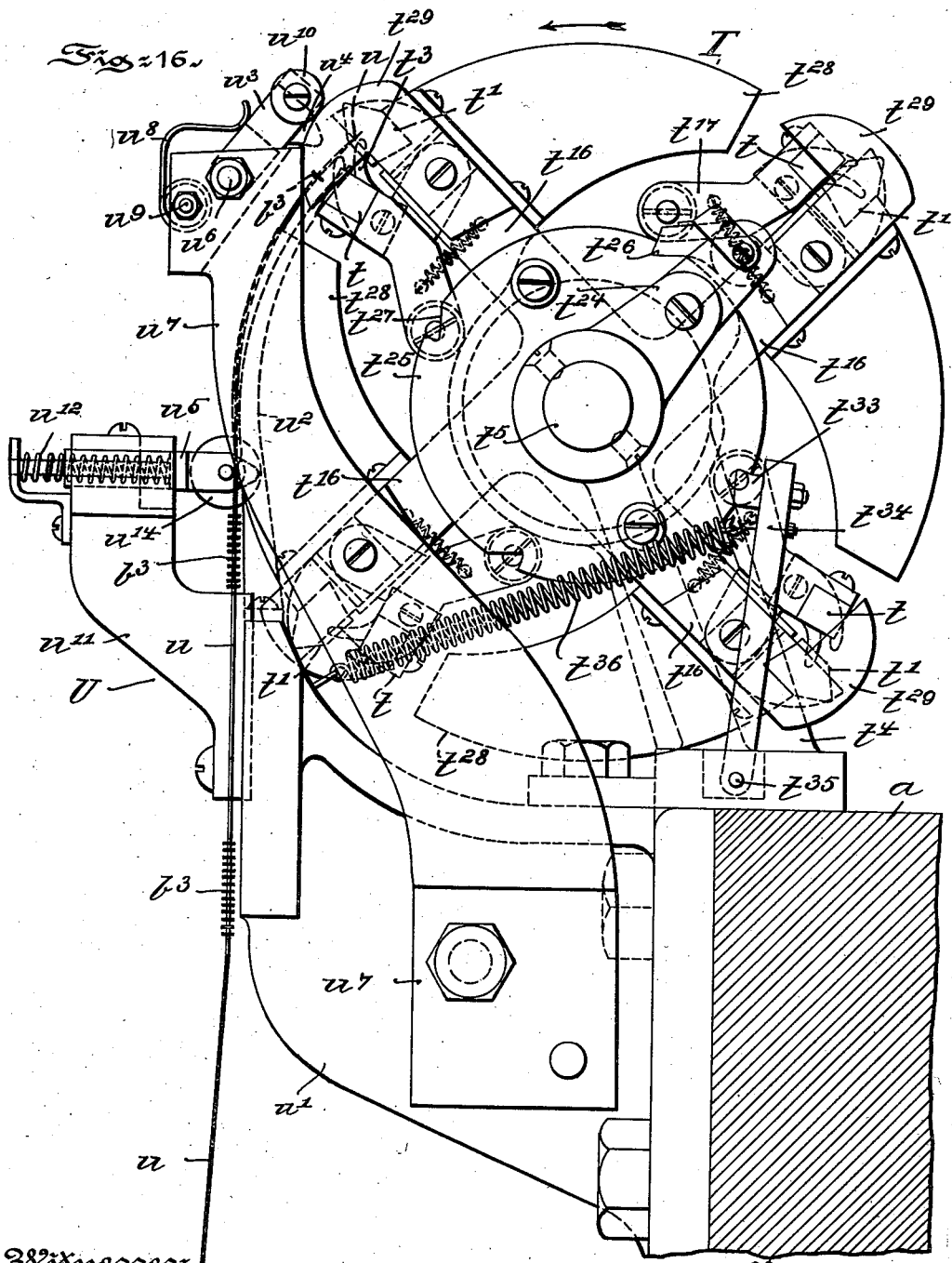

No. 841,679. PATENTED JAN. 22, 1907.
W. FEHR.
MACHINE FOR THE MANUFACTURE OF HEDDLES.
APPLICATION FILED JAN. 20, 1906.
11 SHEETS—SHEET 8.
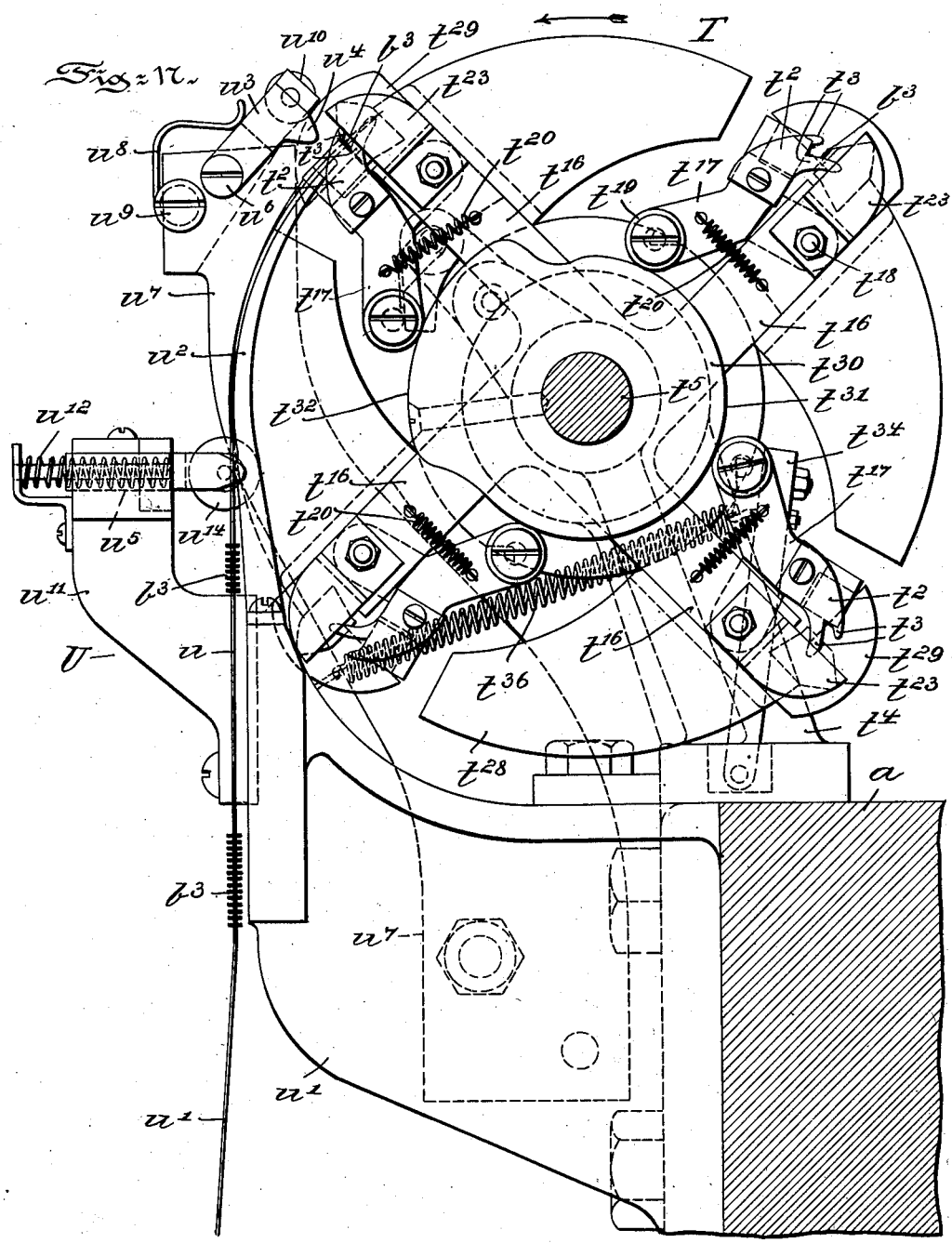

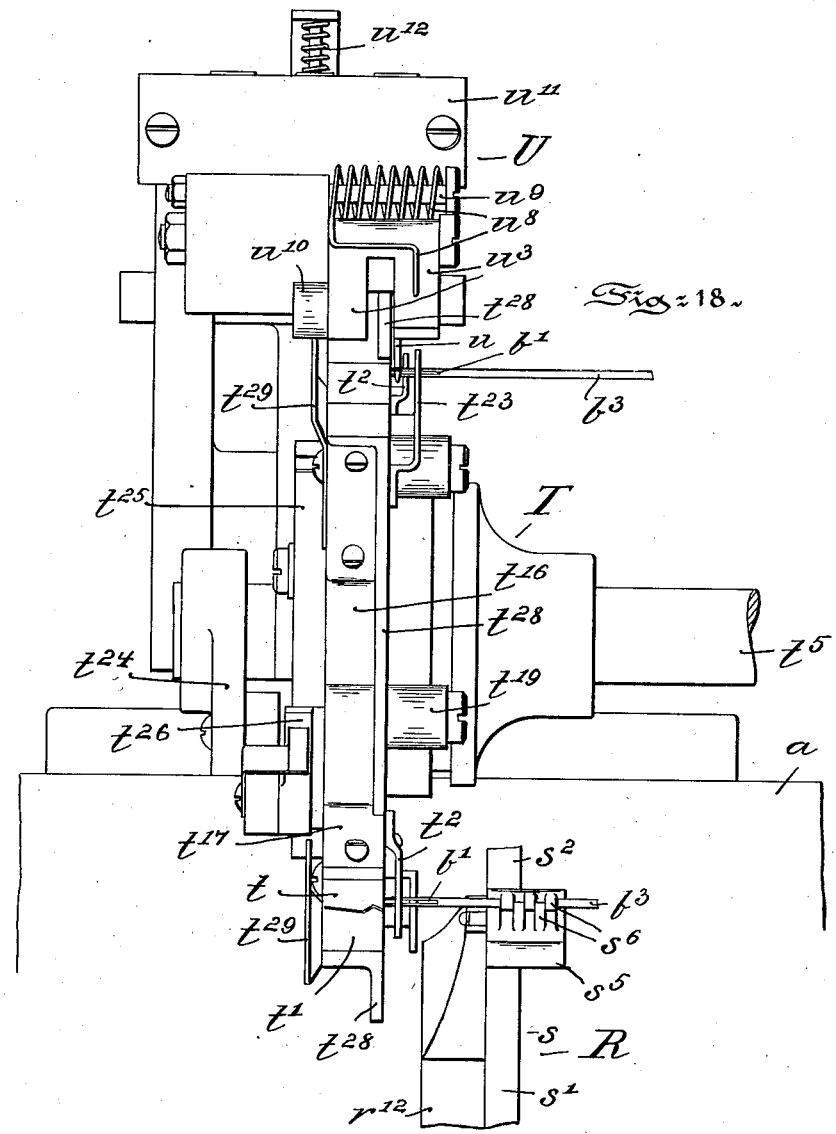

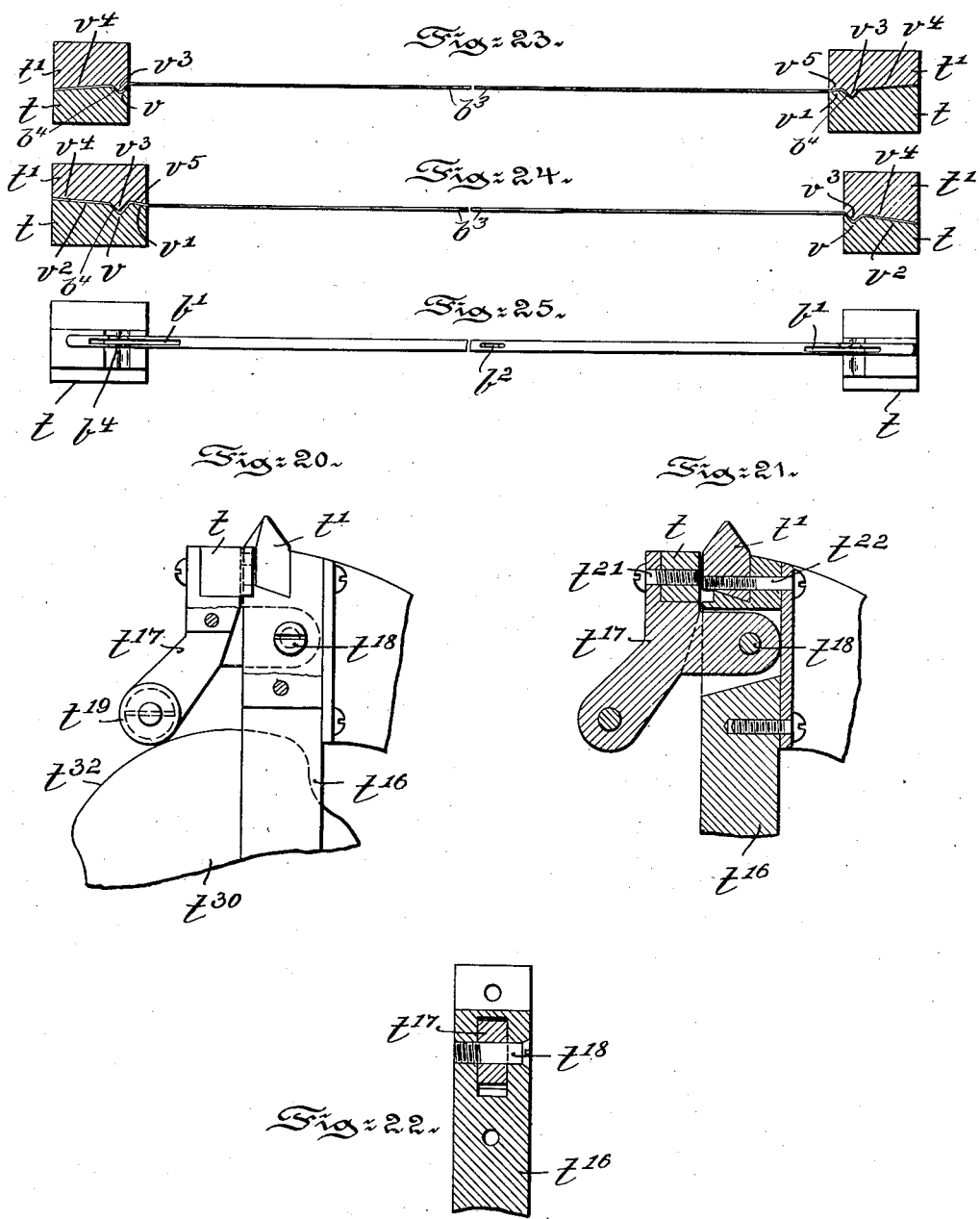

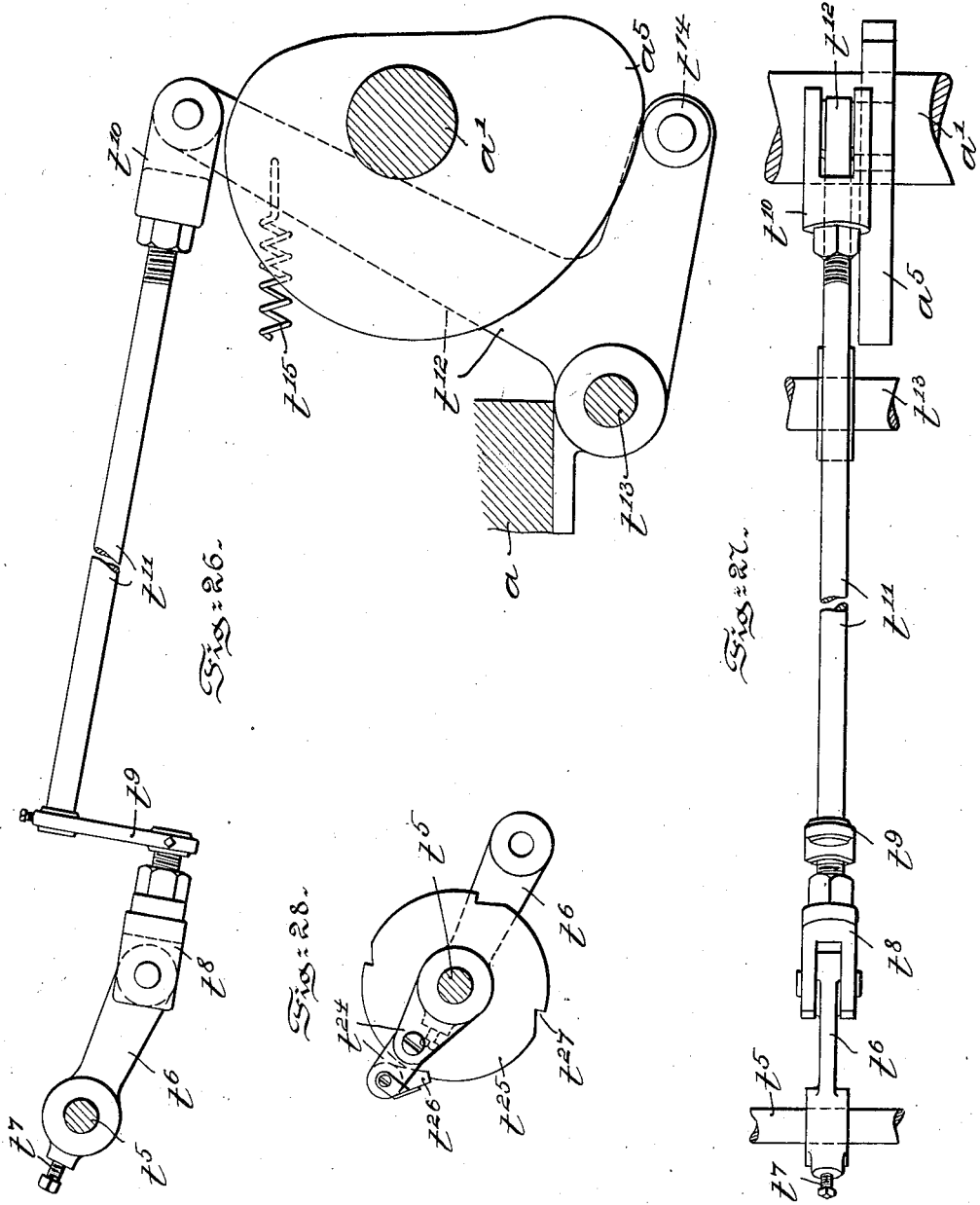

UNITED STATES PATENT OFFICE.

WILLIAM FEHR, OF PHILADELPHIA, PENNSYLVANIA.

MACHINE FOR THE MANUFACTURE OF HEDDLES.

No. 841,679.  Specification of Letters Patent.  Patented Jan. 22, 1907.

Application filed January 20, 1906. Serial No. 296,982.

*To all whom it may concern:*

Be it known that I, WILLIAM FEHR, a citizen of the United States, residing at the city of Philadelphia, in the county of Philadelphia and State of Pennsylvania, have invented certain new and useful Improvements in Machines for the Manufacture of Heddles, of which the following is a specification.

My invention has relation to a machine for the manufacture of heddles, and in such connection it relates particularly to the construction and arrangement of such a machine.

The principal objects of my invention are, first, to provide a machine for the manufacture of heddles with means which after the heddle has been completed and cut from a metal strip or wire forms offsets of varying outline in the heddles and which offsets serve to hold the heddles apart when inserted in a heddle-frame; second, to provide such a machine with means to impart to the offset-forming means a rotary step-by-step movement in one direction to bring the offset-forming means differing in outline successively into a position to receive the heddles; third, to provide such a machine with means for opening and closing the offset-forming means to permit the same to deliver the heddles onto retainers or bars and to form the offsets therein during the delivery thereof; fourth, to provide such a machine with means actuated by the offset-forming means to control the retainers or bars to permit of the holding of the retainers or bars in position at different points during and after threading of the heddles thereon, and, fifth, to provide such a machine with means to engage, remove, and deliver the heddles after being cut to the offset-forming means.

The nature and scope of my present invention will be more fully understood from the following description, taken in connection with the accompanying drawings, forming part hereof, in which—

Figure 1 is a view illustrating in side elevation a machine for the manufacture of heddles and with means connected therewith for forming offsets in the heddles after the same has been cut from a metal strip or wire and with means for receiving and retaining the same, all embodying main features of my said invention. Fig. 2 is an end elevational view of the right-hand end of the machine shown in Fig. 1, partly in section. Fig. 3 is a top or plan view of the right-hand end of the machine, certain parts thereof being removed. Figs. 4, 5, 6, and 7 are detail views, enlarged, illustrating, respectively, in side and front elevations and in top or plan view gripping-fingers in open and closed positions and means for supporting the same. Figs. 8 and 9 are detail views, enlarged, illustrating, partly in section and partly in side and front elevations, means for raising and lowering the gripping-finger-supporting means. Fig. 10 is a detail view, enlarged, illustrating, partly in section and partly in side elevation, the gripping-fingers in closed and raised positions, and means for oscillating the same. Fig. 11 is a similar view illustrating in front elevation, the gripping-fingers and a portion of their supporting and actuating means. Fig. 12 is a similar view illustrating, partly in side elevation and partly in section, the gripping-fingers in lowered and open positions. Figs. 13 and 14 are detail views, enlarged, illustrating, respectively, in side elevation, and in top or plan view, means for opening the gripping-fingers. Figs. 15, 16, 17, and 18 are similar views illustrating, respectively, in front and side elevations, and in top or plan view, means for forming offsets in the heddles and means for receiving and retaining the same. Fig. 19 is a detail view illustrating in top or plan view, means for controlling the retaining mechanism. Figs. 20, 21, and 22 are similar views illustrating, respectively, in side elevation and section, dies and their supporting means, for forming offsets in the heddles. Figs. 23 and 24 are similar views illustrating, respectively, in section and elevation, the dies of the offset-forming means and the manner of forming offsets varying in outline in the heddles. Fig. 25 is a top or plan view of a heddle and of certain of the dies; and Figs. 26, 27, and 28 are detail views, enlarged, illustrating, respectively, in side elevation, top or plan view, and in side elevation, mechanisms for imparting to the offset-forming means, a step-by-step movement, in one direction.

Referring to the drawings with reference to Figs. 1 and 2, $a$ represents the bed-plate of the machine, to which is suitably secured a main or driving shaft $a'$, driven from any suitable source of power. (Not shown.) Upon the bed-plate $a$ are removably arranged at certain distances apart a punching or perforating mechanism C, a swaging mechanism G, a clamping and cutting mechanism M, and feeding mechanism O, such as have been described and claimed in an application filed by me under date of December 22, 1905, under the Serial No. 292,946, which coöperate to form a heddle from a metal strip or wire $b$. The metal strip or wire $b$ coming directly from a reel (not shown) is conducted to the punching mechanism C, which by means of punches $d$, actuated by a frame $c^2$, slidably arranged in a standard $c$, and dies $e$, carried by the same, punch in the metal strip in one operation any desired number of slots or openings $b'$ at various predetermined distances apart and, if required, in proximity to each other. After the metal strip $b$ has been punched or perforated the same is conducted to the swaging mechanism G, which by means of swaging-tools $g'$ and $g^2$ swage or expand the metal strip $b$ at the slotted portion $b'$ thereof by spreading the metal at the ends of the slots. From the swaging mechanism G the strip is conducted to the cutting mechanism M, which by means of dies $m'$ and $m^2$ cuts the metal strip $b$ into sections of predetermined length and at the same time holds the metal strip in position during the punching and swaging operations. The metal strip $b$ is fed forward from left to right in Fig. 1 for variable lengths by the gripping and feeding mechanism O, such as has been shown and described in Letters Patent No. 699,508, granted to me under date of May 6, 1902, and consisting of a guide-bar $o$, upon which is adapted to reciprocate a casing $o'$, in which are arranged gripping-jaws $o^2$, actuated by a slide $o^3$ in a manner not shown, which slide is connected by a rod $o^4$ with a lever-arm $o^5$. To the lever-arm $o^5$ is imparted an oscillating movement by means not shown, which by means of the rod $o^4$ is transferred to the slide $o^3$ and by the same to the casing $o'$, which is thus reciprocated on the bar $o$.

Before or at the moment of completion of the forward movement of the metal strip $b$ the same is engaged by an oscillating gripping and delivering mechanism R, which grips, conducts, and delivers the cut sections of the metal strip $b$, which now forms a completed heddle, to an offset-forming mechanism T, which during the delivering of the heddle to a retaining mechanism U forms offsets in the same. This oscillating gripping and delivering mechanism R, the offset-forming mechanism T, and retaining mechanism U form the subject-matter of the present application.

As shown in Figs. 4 to 14, inclusive, the oscillating gripping mechanism R for the heddles $b^3$ consists of brackets $r$, secured to the bed-plate $a$, in which are slidably arranged blocks $r'$, serving as a support for a shaft $r^2$ and a rotatable shaft $r^3$. To the shaft $r^3$ are secured cams $r^4$, adapted to engage and raise the blocks $r'$ and shaft $r^2$ against the tension of the springs $r^5$ for a purpose to be presently described. To the cam-shaft $r^3$ by means of a crank-arm $r^6$, links $r^7$, rod $r^8$, and lever-arm $r^9$, pivotally secured in the point $r^{10}$ to the bed-plate $a$ of the machine, is imparted a rocking movement by a cam $a^2$, arranged on the driving-shaft $a'$ and engaging a roller $r^{11}$ of the lever-arm $r^9$. By this rocking movement the cams $r^4$ are brought alternately into and out of engagement with the blocks $r'$, which are thus raised by the cams $r^4$ and depressed by the springs $r^5$ in the brackets $r$. Upon the shaft $r^2$ are arranged supports $r^{12}$ for gripping-fingers $s$, which supports are adjustably connected with the shaft $r^2$, preferably by brackets $r^{13}$. The brackets $r^{13}$ are provided at their forked ends with clamping-screws $r^{15}$, engaging a projection $r^{14}$ of the supports $r^{12}$ from opposite sides, and thus adjustably holding the supports $r^{12}$ in proper position on the shaft $r^2$, while clamping-bolts $r^{16}$ of the bracket $r^{13}$ permit of an adjustment of the same with respect to the shaft $r^2$. As shown in Figs. 10 and 11, to the shaft $r^2$, and thus to the gripping-fingers $s$, by means of a crank-arm $r^{17}$, links $r^{18}$, rod $r^{19}$, and the lever-arm $r^{20}$, is imparted a rocking movement. The lever-arm $r^{20}$, pivotally connected in the point $r^{21}$ to the bed-plate $a$ of the machine, is actuated by a cam $a^3$, secured to the driving-shaft $a'$, engaging a roller $r^{22}$ and a spring $r^{23}$. By this rocking movement of the shaft $r^2$ the gripping-fingers $s$ by means of their supports $r^{12}$ are oscillated between the feeding mechanism O and the offset-forming mechanism T and are raised and lowered during this movement. Each of the supports $r^{12}$ is provided with a removable block $r^{24}$, having a laterally-extending tongue $r^{25}$, substantially triangular in cross-section, which serves to support the heddle $b^3$, cut from the metal strip $b$ by the cutting mechanism M during its delivery from the feeding mechanism O to the offset-forming mechanism T. The heddles $b^3$ are held in position on the tongue $r^{25}$ by the gripping-fingers $s$, each consisting of arms $s'$ and $s^2$, pivotally connected in the points $s^3$ with their respective supports $r^{12}$ and connected with each other by a link $s^4$. The upper portions of the arms $s'$ and $s^2$ form jaws $s^5$, provided with teeth or projections $s^6$, which interlock when brought into engagement with each other. Between the lower portions of the arms $s'$ and $s^2$ is arranged a spring $s^7$, tending to close the jaws $s^5$ of the fingers $s$, and thus to hold the same in engagement with the tongue $r^{25}$ of the respective supports $r^{12}$.

When the fingers $s$ are moved by the cam $a^3$ into the position shown in Fig. 10, the same are first lowered to bring the fingers beneath the metal strip $b$, so as to clear the same, as will be readily understood from Fig. 2. The fingers $s$ are held in proper position directly beneath the metal strip $b$ by an adjusting-bolt $s^8$ of a standard $s^9$, against which the support $r^{12}$ of the fingers abuts. By this forward movement the arms $s^2$ of each of the fingers $s$ by means of adjusting-bolt $s^{10}$ of the standards $s^9$ will be moved toward the support $r^{12}$ against the tension of the spring $s^7$. The movement of the arm $s^2$ by means of the link $s^4$ is transmitted to the arm $s'$, and thus the jaws $s^5$ of the arms $s'$ and $s^2$ are opened to an extent sufficient to permit of the ready entering of the metal strip $b$ therein. The opened fingers $s$ are now raised and brought into engagement with the metal strip $b$ at or before the strip is released by the feeding mechanism O and severed, by the cutting mechanism M, at which instance a heddle $b^3$ is formed. At this time and at the end of the upward movement of the fingers $s$ the arm $s^2$ thereof will be brought out of engagement with the adjusting-bolt $s^{10}$ to permit the spring $s^7$ to bring the jaws of the fingers $s$ into engagement with the tongue $r^{25}$, which supports the heddle $b^3$, to clamp and hold the same in position on the tongue $r^{25}$ by its interlocking teeth $s^6$. The fingers $s$ by their support $r^{12}$ are now swung from the position shown in Fig. 10 into that shown in Figs. 12 and 18, by which movement the heddle $b^3$ is introduced between dies $t$ and $t'$ of the offset-forming mechanism T, occupying the right-hand upper open position in Fig. 17. The heddles $b^3$ are held in proper position between the dies $t$ and $t'$ by projections $t^3$ of a plate $t^2$, secured to one of the die-holders of the offset-forming mechanism T. In this position of the fingers $s$ the arm $s'$ thereof will be brought into engagement with bolts $s^{11}$ of the lever-arms $s^{12}$ and $s^{13}$, pivotally secured in the points $s^{14}$ to the bed-plate $a$ of the machine. As shown in Figs. 3, 12, 13, and 14, the lever-arms $s^{12}$ and $s^{13}$ by means of a slide $s^{15}$, through the intervention of brackets $s^{16}$, secured to the bed-plate $a$, are connected with a lever-arm $s^{17}$, which arm is pivotally secured in the point $s^{18}$ to the bed-plate $a$. The lever-arm $s^{17}$ by means of a roller $s^{19}$ engages a cam $a^4$, secured to the driving-shaft $a'$, which cam $a^4$ by actuating the lever $s^{17}$ shifts the slide $s^{15}$ from left to right and a spring $s^{20}$ from right to left in Fig. 12. By the latter movement the slide $s^{15}$ actuates the levers $s^{12}$ and $s^{13}$, which by means of bolts $s^{11}$ move the arms $s'$ of the gripping-fingers against the tension of the spring $s^7$ toward their support $r^{12}$, and thus open the jaws thereof at the moment the heddle $b^3$ is introduced between the projections $t^3$ of the plate $t^2$, arranged adjacent to the dies $t$ and $t'$ of the offset-forming mechanism T. At this time the fingers $s$ are also lowered and are thus entirely freed from the heddle $b^3$. An adjusting-bolt $s^{21}$, carried by a standard $s^{22}$, secured to the bed-plate $a$, limits the movement of the supports $r^{12}$, and thus of the gripping-fingers $s$, carried by the same, when occupying the position shown in Fig. 12. The levers $s^{12}$ and $s^{13}$, which open the fingers $s$, are connected with each other, preferably by a bolt $s^{23}$, secured to the lever $s^{13}$, which passes through an opening $s^{24}$, arranged in the lever $s^{12}$, as shown in Fig. 14. In addition to the supports $r^{12}$, carrying the fingers $s$, the shaft $r^2$ may also be provided with a third support $s^{25}$, preferably intermediate of the supports $r^{12}$, as shown in Fig. 1. This support $s^{25}$ prevents sagging or bending of the heddle $b^3$ in its central portion during its delivery to the offset-forming mechanism T. However, in most instances the fingers $s$ engaging the heddle $b^3$ adjacent to their ends are sufficient to hold the heddle in a perfectly straight position.

As shown in Figs. 1, 2, 3, and 15 to 28, inclusive, the offset-forming mechanism T, carrying two series of differently-shaped sets of dies $t$ and $t'$, preferably consists of standards $t^4$, secured to the bed-plate $a$, which loosely support a shaft $t^5$. As shown in Fig. 3, substantially intermediate of the die-carrying mechanism the shaft $t^5$ is provided with a lever-arm $t^6$, adjustably secured thereto by a clamping-bolt $t^7$, which by means of links $t^8$ $t^9$ $t^{10}$ and a rod $t^{11}$ is secured to a lever-arm $t^{12}$. The lever-arm $t^{12}$, pivotally secured in the point $t^{13}$ to the bed-plate $a$ by means of a roller $t^{14}$, engages a cam $a^5$, secured to the driving-shaft $a'$, and is actuated by the same, as well as the spring $t^{15}$. By the movements of the lever-arm $t^{12}$ the shaft $t^5$ is rocked in the standards $t^4$, as will be readily understood from Figs. 26 and 27, for a purpose to be hereinafter more fully described. On the shaft $t^5$ at certain distance apart from each other are loosely mounted two sets of arms $t^{16}$, arranged substantially in a radial position with respect to the shaft $t^5$. To each of the arms $t^{16}$ is pivotally secured in the point $t^{18}$ a lever-arm $t^{17}$, provided at its lower free end with a roller $t^{19}$, arranged in the path of a cam $t^{30}$, rigidly secured to the shaft $t^5$ and held by the same adjacent to each set of arms $t^6$, as shown in Fig. 17.

At the upper free end, each of the lever-arms $t^{17}$ carries a die $t$, removably secured thereto by a screw $t^{21}$, and opposite thereto on the arm $t^{16}$ is arranged a die $t'$, removably secured thereto by a screw $t^{22}$. A spring $t^{20}$ normally tends to hold the arm $t^{17}$ and its die $t$ out of engagement with the arm $t^{16}$ and its die $t'$, at which time the roller $t^{19}$ of the arm $t^{17}$ bears against the portion $t^{31}$ of the cam $t^{30}$. In this position of the lever-arm $t^{17}$ and its die $t$ the heddle $b^3$ can be freely inserted by the fingers $s$ between the dies $t$ and $t'$, which are held by their respective arms $t^{16}$ and $t^{17}$ in the right-hand upper position shown in Fig. 17. The heddle $b^3$ in this instance is held in position between the open dies $t$ and $t'$ by the lower one of the projections $t^3$ of a plate $t^2$, secured to the lever-arm $t^{17}$, between which the same has been delivered by the fingers $s$, as hereinbefore described. The plate $t^2$ is secured to the inner side of the lever-arm $t^{17}$, thus permitting the projections $t^3$ thereof to support the heddle $b^3$ by engaging the same a certain distance from their respective ends, as shown in Fig. 18. The lower one of the projections $t^3$ in the open position of the dies $t$ and $t'$ extends beyond the die $t$ a sufficient distance to pass beyond the face of the die $t'$ and between the same and a plate $t^{23}$, and thus to securely hold the heddle $b^3$ in position between the dies. As soon, however, as the heddle has been placed upon the lower projection $t^3$ of the plate $t^2$ the cam $t^{30}$ being actuated by the shaft $t^5$ raises by its throw portion $t^{32}$ the free end of the lever $t^{17}$, and thus brings its die $t$ into engagement with the die $t'$, carried by the arm $t^{16}$, against the tension of the spring $t^{20}$, as shown in Fig. 16. By this forward movement of the die $t$ the heddle $b^3$ is brought into engagement with both of the projections $t^3$ of the plate $t^2$ by the plate $t^{23}$ of the arm $t^{16}$ and is securely held in position between the dies $t$ and $t'$, which at the same time have formed an offset $b^4$ in the heddle $b^3$. By the movement of the shaft $t^5$ and the cam $t^{30}$ from left to right in Figs. 16 and 17 an arm $t^{24}$, rigidly secured to the shaft $t^5$ and held by the same adjacent to a notched disk $t^{25}$, secured to the arms $t^{16}$, is moved in the same direction, and by which movement a pawl $t^{26}$ thereof will be brought out of engagement with a notch $t^{27}$ of the disk $t^{25}$ and into engagement with another notch thereof, by freely sliding over the disk $t^{25}$. By the following movement from right to left of the shaft $t^5$ and cam $t^{30}$ the disk $t^{25}$ is moved in the same direction by the arm $t^{24}$, thus turning the arms $t^{16}$ and bringing the heddle $b^3$ and dies $t$ and $t'$ from the upper right-hand position in Figs. 16 and 17 to the upper left-hand position thereof and at the same time into engagement with retainer-bars $u$, which pass into the portion of the mortises $b'$ of the heddle $b^3$ projecting beyond the dies $t$ and $t'$. Thus to each set of arms $t^{16}$ by means of the arm $t^{24}$, pawl $t^{26}$, and disk $t^{25}$ is imparted a step-by-step movement in one direction, bringing each of the four arms $t^{16}$, successively, into the upper right-hand position shown in Figs. 16 and 17 to receive the heddle $b^3$, delivered thereto by the fingers $s$. Instead of using four arms in each set of arms a greater or less number of arms may be employed, in which instance the rotary step-by-step movement imparted thereto, will either exceed or will be less than ninety degrees, as is the case by the present arrangement of the arms $t^{16}$. By the movement of the arms from right to left in Figs. 16 and 17 the throw portion $t^{32}$ of the cam $t^{30}$ will remain in engagement with the roller $t^{19}$ of the lever-arm $t^{17}$, and thus hold the dies $t$ and $t'$ in closed position. As soon, however, as the cam $t^{30}$ has been swung out of engagement with the roller $t^{19}$ of the arm $t^{17}$ the latter, with the die $t$, under the influence of the spring $t^{20}$ are disengaged from the die $t'$, and the heddle $b^3$ now engaged by the retainer-bars $u$, will be lifted by the same out of engagement with the projections $t^3$ of the plate $t^2$ and the dies $t$ and $t'$ and slide down on the bars $u$ until limited in its downward movement by a wing $t^{28}$, secured to each of the arms $t^{16}$.

In order to prevent a movement of the arms $t^{16}$ opposite to that indicated by the arrows in Figs. 16 and 17, the notched disk $t^{25}$, secured thereto, is engaged by a pawl $t^{33}$, carried by an arm $t^{34}$, pivotally secured in the point $t^{35}$ to the bracket $t^4$ of the rocking shaft $t^5$, as shown in Fig. 16. A spring $t^{36}$ tends to hold the pawl $t^{33}$ in engagement with the disk $t^{25}$ and notch $t^{27}$ thereof. By the introduction of the heddle $b^3$ between the dies $t$ and $t'$ and by the closing of the same the heddles are bent, and in the same are formed, preferably adjacent to their ends, in the present instance in the portions provided with mortises $b'$, offsets $b^4$, differing from each other in their outline, as shown in Figs. 23 and 24, in which the heddles are illustrated as being still held between the dies $t$ and $t'$. These offsets $b^4$ of differing outline serve to hold the heddles apart by abutting at their free ends against each other when inserted in a heddle-frame and also perform the function of springs, in that these offsets separate the heddles and return the same to their proper position with respect to each other, when removed therefrom by pressure or otherwise. In order to form offsets $b^4$ of alternate varying outline, the contiguous faces of the dies $t$ and $t'$ vary in their shape, as well as in their widths, in each succeeding set of dies, as shown in Figs. 23 and 24. For this purpose each of the dies $t$ is provided with a depression $v$, which in one of the sets of the two dies $t$, held in alinement with each other, terminates at the inner edge of the die $t$, while in the other is located a short distance from the inner edges to form an inclined portion $v'$. Between the depression $v$ and the outer edge of both of the dies $t$ in each set is arranged an inclined portion $v^2$, which, however, varies in its arrangement in that in one of the dies $t$ the portion $v^2$ inclines downwardly toward the outer edge, while in the other inclining upwardly toward the outer edge. The faces of the dies $t'$ are formed so as to follow the outline of the faces of the dies $t$ when brought into engagement therewith, for which purpose, each of them is provided with projections $v^3$, fitting into the depression $v$ of the die $t$, and with inclined portions $v^4$, and one with an additional inclined portion $v^5$, as shown in Figs. 23 and 24. By the varying outline of each set of dies $t$ and $t'$, held opposite to and in alinement with each other, in the offset-forming mechanism T, the offsets formed thereby in the respective heddles $b^3$ will not alone vary in shape at each end of the heddle, but also in each succeeding heddle formed. Thus the heddles $b^3$ when placed side by side will be held apart by the outwardly-flaring end portions of the offsets $b^4$, as will be readily understood from Figs. 23 and 24.

As shown in Figs. 1, 2, 15, 16, and 17, the retainer-bars $u$ of the retaining mechanism U preferably consist of thin strips of steel, which are held in proper position to each set of arms $t^{16}$ and their dies $t$ and $t'$ by the following preferred mechanism:

To a bracket $u'$, carried by the bed-plate $a$, is secured a bracket $u^2$ for each of the bars $u$, curved at the free end thereof. This bracket $u^2$ serves as a support for the bar $u$ when held in engagement with the bracket $u^2$ by the projection $u^4$ of an arm $u^3$ and by a slide $u^5$. The arm $u^3$ is pivotally secured in the point $u^6$ to a bracket $u^7$, carried by the bracket $u'$, and held with its projection $u^4$ in engagement with the bar $u$ by a spring $u^8$, carried by a bolt $u^9$. A roller $u^{10}$, carried by the arm $u^3$, is held by the arm in the path of a cam $t^{29}$, secured to each of the arms $t^{16}$ of the offset-forming mechanism T. This slide $u^5$, carried by a bracket $u^{11}$, secured to the bracket $u'$, is provided with an extension $u^{13}$, held by a spring $u^{12}$ in engagement with the retainer-bar $u$, which in turn is held in engagement with the bracket $u^2$. Each of the retainer-bars $u$ is thus held at two different points in engagement with the bracket $u^2$ and is successively disengaged therefrom by the following preferred mechanism: Each of the bars $t^{16}$ is provided with a cam $t^{29}$, which when brought into engagement with the roller $u^{10}$ of the arm $u^3$ brings the projection $u^4$ thereof out of engagement with the retainer-bar $u$, as shown in Fig. 16. The retainer-bar $u$ thus freed from the projection $u^4$ swings outward away from the support $u^2$, and the heddle $b^3$, which has been previously threaded upon the bar $u$, is thus brought out of engagement with the dies $t$ and $t'$ and the projections $t^3$ of the plate $t^2$, as shown in Fig. 16. The heddle is now permitted to slide down on the bars $u$ by gravity until arrested in such movement by the wings $t^{28}$, secured to each of the two sets of arms $t^{16}$. As soon as the cam $t^{29}$ is brought out of engagement with the roller $u^{10}$ of the arm $u^3$ the latter with its projection $u^4$ is brought into reëngagement with the retainer-bar $u$, thus clamping the same to the bracket $u^2$. At the same time the cam $t^{29}$ by its forward movement will be brought into engagement with a roller $u^{14}$, secured to the slide $u^5$, disengaging the same from the bar $u$, which so freed recedes from the bracket $u^2$. The heddle resting on the wing $t^{28}$ is now shifted downward on the bar $u$ by the plate $t^2$ of the lever-arm $t^{17}$, carrying the die $t$, until the same by the rotation of the arms $t^{16}$ is brought out of engagement with the heddle $b^3$, which now descends by gravity on the bar and is held in position by the same until removed therefrom.

Instead of punching, swaging, cutting, and feeding the metal strip or wire by the punching mechanism C, swaging mechanism G, cutting mechanism M, and feeding mechanism O any other suitable mechanisms may be substituted in the formation of the heddle, according to my invention, from a narrow flat strip of metal or wire $b$, without departing from the spirit or scope thereof.

Having thus described the nature and objects of my invention, what I claim as new, and desire to secure by Letters Patent, is—

1. In a machine of the character described, rotary means for receiving a heddle, means for imparting to said rotary means a step-by-step movement in one direction, said rotary means adapted to form offsets in the heddle.

2. In a machine of the character described, rotary means for receiving heddles, means for imparting to said rotary means a step-by-step movement in one direction, said rotary means adapted to form during each of its movements, offsets of varying outline in the heddle.

3. In a machine of the character described, means for collecting and retaining heddles, and means for receiving heddles and for forming offsets therein, during delivery to said retaining means.

4. In a machine of the character described, means having a plurality of members, each of said members adapted to receive a heddle and to form offsets therein, and means adapted to engage and to deliver the heddles to each of the members of said offset-forming means.

5. In a machine of the character described, means for receiving heddles and for forming offsets therein, means for engaging and delivering the heddles to said offset-forming means, and means for collecting and retaining heddles delivered thereto by said offset-forming means.

6. In a machine of the character described, means for punching a metal strip to form slots therein, means for cutting the strip to form heddles by the severed portion of said strip, means for receiving the heddles and for forming offsets therein to complete the heddles, and means for engaging and conducting the heddles to said offset-forming means.

7. In a machine of the character described, means for punching a metal strip to form slots therein, means for cutting the strip to form heddles by the severed portions of said strips, means for retaining and collecting the heddles, means for receiving the heddles and for forming offsets therein to complete the heddles during delivery of the heddles to said retaining means, and means for engaging and conducting the heddles to said offset-forming means.

8. In a machine of the character described, means for punching a metal strip to form slots therein, means for cutting the strip to form heddles by the severed portions of said strip, means for retaining and collecting the heddles, means for receiving and forming offsets of varying outline therein to complete the heddles, during delivery to said retaining means, and means for engaging and conducting the heddles to said offset-forming means.

9. In a machine of the character described, rotary means having sets of dies for receiving heddles, means for imparting to said rotary means a step-by-step movement in one direction to bring each set of dies successively into an operative position, and means for bringing said dies into and out of engagement with each other, to form offsets in the heddles.

10. In a machine of the character described, rotary means having sets of dies for receiving heddles, means for imparting to said rotary means a step-by-step movement in one direction to bring each set of dies successively into an operative position, means for bringing said dies into and out of engagement with each other to form offsets in the heddles, and means carried by said rotary means for holding the heddles in position between said dies.

11. In a machine of the character described, rotary means having a plurality of members, each of said members having sets of dies differing from each other, means for imparting to said rotary means a step-by-step movement in one direction to bring the dies of each of said members into a position to receive a heddle, and means for bringing said dies into and out of engagement with each other, to form offsets in the heddles.

12. In a machine of the character described, means having sets of dies, differing in outline from each other, each set arranged to receive a heddle, means for bringing said dies into and out of engagement with each other to form offsets in the heddles, and means for bringing each set of dies into a position to receive a heddle.

13. In a machine of the character described, means having sets of dies, differing in outline from each other, each set arranged to receive a heddle, means for bringing said dies into and out of engagement with each other to form offsets in the heddles, means for bringing each set of dies into a position to receive a heddle, and means for holding the heddle in position between said dies.

14. In a machine of the character described, means having sets of dies, each set arranged to receive a heddle, means for bringing said dies into and out of engagement with each other, to form offsets in the heddles, means for bringing a set of dies into a position to receive the heddles, and a gripping mechanism for engaging and delivering a heddle to each set of said dies.

15. In a machine of the character described, means having sets of dies, each set arranged to receive a heddle, means for bringing said dies into and out of engagement with each other, to form offsets in the heddles, means for imparting to said die-carrying means a step-by-step movement in one direction to bring each set of dies, successively, into a position to receive a heddle, a gripping mechanism for engaging and delivering a heddle to each set of said dies, and a retaining mechanism for receiving the heddles.

16. In a machine of the character described, means for punching a metal strip to form slots therein, means for cutting the strip to form by the cut portion a heddle, means having sets of dies arranged to receive a heddle by engaging the same at or near its ends to form offsets therein, to complete the heddle, means for imparting to said die-carrying means a step-by-step movement in one direction, to bring each set of dies, successively, into a position to receive a heddle, a gripping mechanism for engaging and delivering a heddle to each set of dies, and a retaining mechanism, for receiving and removing the heddles from said dies.

17. In a machine of the character described, an offset-forming mechanism, comprising two series of arms, each arm having a lever-arm pivotally connected therewith, a die carried by each of said arms and lever-arms forming sets of dies, and means for actuating said arms to bring each set of said dies, successively, into a position to receive and form offsets in the heddle.

18. In a machine of the character described, an offset-forming mechanism, comprising two series of arms, each arm having a lever-arm pivotally connected therewith, a die carried by each of said arms and lever-arms forming sets of dies, means carried by said arms to hold a heddle in position between said dies, and means for actuating said arms to bring each set of said dies, successively, into a position to receive and form offsets in the heddle.

19. In a machine of the character described, an offset-forming mechanism, comprising two series of radial arms, each arm having a lever-arm pivotally connected therewith, a die carried by each of said arms and lever-arms forming sets of dies, means for imparting a step-by-step movement to said radial arms to bring each set of said dies into a position to receive a heddle, and means for forcing said lever-arms and their dies against the dies of said radial arms and for holding the same out of engagement therewith to form offsets in the heddle by said dies and to permit of a disengagement of the heddle therefrom.

20. In a machine of the character described, an offset-forming mechanism, comprising two series of radial arms, each arm having a lever-arm pivotally connected therewith, a die carried by each of said arms and lever-arms forming sets of dies, means for imparting a step-by-step movement to said radial arms to bring each set of said dies into a position to receive the heddle, a plate carried by said lever-arms for holding the heddle in position between the open dies, and means for forcing said lever-arms and their dies against the dies of said radial arms and for holding the same out of engagement therewith to form offsets in the heddle by said dies and to permit of disengagement of the heddle therefrom.

21. In a machine of the character described, an offset-forming mechanism, comprising two series of radial arms, each arm having a lever-arm pivotally connected therewith, a die carried by each of said arms and lever-arms forming sets of dies, means for imparting a step-by-step movement to said radial arms to bring each set of said dies into a position to receive a heddle, a plate carried by said lever-arms and by said radial arms for holding the heddle in position between the dies, and means for forcing said lever-arms and their dies against the dies of said radial arms and for holding the same out of engagement therewith to form offsets in the heddle by said dies and to permit of disengagement of the heddle therefrom.

22. In a machine of the character described, an oscillating gripping and delivering mechanism, comprising gripping-fingers, connected with each other, means for supporting and oscillating said fingers, means for normally holding said fingers in a closed position, means for raising and lowering said supporting means and by the same said fingers, and means for opening said fingers to permit of the engagement of the same and removal of the heddle from said finger.

23. In a machine of the character described, an oscillating gripping and delivering mechanism, comprising fingers having jaws, a shaft having arms for supporting said fingers and a heddle introduced between the jaws of the same, means for normally holding said fingers in a closed position, means for opening said fingers to permit of the entrance and removal of the heddle from the same, means for raising and lowering said supporting-arms and fingers to permit the latter to engage the heddle held above the same and means for rocking said shaft to oscillate said supports and fingers.

24. In a machine of the character described, a collecting and retaining mechanism, comprising bars for receiving and retaining heddles, brackets, means separated from each other for engaging said bars at different portions to hold the same in engagement with said bracket and means for bringing said engaging means successively out of engagement with said bars to permit the same to clear the brackets and said bars adapted when freed from said brackets to permit of descent of heddles thereon.

25. In a machine of the character described, a collecting and retaining mechanism, comprising bars for receiving heddles, brackets, means separated from each other for holding said bars at their upper ends and portion adjacent thereto in engagement with said brackets, means for bringing said engaging means successively out of engagement with said bars to permit the same to clear said brackets, said bars adapted when released at their upper ends to receive the heddles and when released below the ends to permit of the descent of the heddles thereon.

26. In a machine of the character described, means for punching and cutting a metal strip to form a heddle, two series of radial arms having lever-arms, each of said radial arms and lever-arms having a die, bars, oscillating fingers for engaging and delivering the heddle to said dies, said dies arranged to form offsets in the heddle, introduced between the dies and to deliver the heddle to said bars.

27. In a machine of the character described, means for punching and cutting a metal strip to form a heddle, two series of radial arms having lever-arms, each of said radial arms and lever-arms having a die, bars, oscillating fingers for engaging and delivering the heddle to said dies, said dies arranged to form offsets in the heddle introduced between the dies and to deliver the heddle to said bars, and said bars arranged to remove the heddle from said dies.

28. In a machine of the character described, means for punching, feeding and cutting a metal strip to form heddles, two series of radial arms having lever-arms, a die carried by each of said radial arms and lever-arms, means for imparting to both series of radial arms a step-by-step rotary movement, bars arranged adjacent to the dies of both series of radial arms, when the same assume periodically certain positions, oscillating fingers for engaging and delivering the heddle between said dies, said dies arranged to form offsets in the heddle and to deliver the same to said bars.

29. In a machine of the character described, means for punching, feeding and cutting a metal strip to form heddles, two series of radial arms having lever-arms, a die carried by each of said radial arms and lever-arms, means for imparting to both series of radial arms a step-by-step rotary movement, bars arranged adjacent to the dies of both series of radial arms, when said dies assume periodically certain positions, oscillating fingers for engaging and delivering the heddle between said dies, said dies arranged to form offsets in the heddle and to deliver the same to said bars, and said bars arranged to remove the heddle from said dies and retain the same.

30. In a machine of the character described, means for punching, feeding and cutting a metal strip to form heddles, two series of radial arms and lever-arms, a die carried by each of said radial arms and lever-arms, two oppositely-arranged dies forming a set of dies, bars arranged adjacent to the sets of dies of both series of arms, when the same assume periodically certain positions, oscillating fingers for engaging and delivering the heddle between the sets of dies occupying a certain operative position, means for bringing the sets of dies, successively, into the operative position by imparting to said radial arms a step-by-step rotary movement, said dies arranged to form offsets in the heddle and to deliver the same to said bars and said bars arranged to remove the heddle from said dies and retain the heddle.

31. In a machine of the character described, means for punching, feeding and cutting a metal strip to form heddles having mortises, two series of radial arms and lever-arms, a die carried by each of said radial arms and lever-arms, two oppositely-arranged dies forming a set of dies, means carried by said arms and lever-arms to support the heddle between the dies, bars arranged adjacent to the sets of dies of both series of arms, when the same assume periodically certain positions, oscillating fingers for engaging and delivering the heddle between the sets of dies occupying a certain operative position, means for bringing the sets of dies, successively, into the operative position by imparting to said radial arms a step-by-step rotary movement, said dies arranged to form offsets in the heddle and to thread the same with its mortises onto said bars and said bars arranged to remove the heddle from said dies and to retain the heddle.

In testimony whereof I have hereunto set my signature in the presence of two subscribing witnesses.

WILLIAM FEHR.

Witnesses:
H. L. BEAUMONT,
F. KAUFMANN.